United States Patent [19]
Horacek et al.

[11] Patent Number: 6,031,032
[45] Date of Patent: *Feb. 29, 2000

[54] FLAMEPROOF, GLASS FIBRE-REINFORCED POLYAMIDE RESIN COMPOUND WITH MELAMINE OR MELEMPHOSPHORIC ACID REACTION PRODUCTS AS FLAME RETARDANTS

[75] Inventors: Heinrich Horacek; Rudolf Reichenberger, both of Linz; Klaus Ritzberger, Alkoven; Christian Prinz, Leonding, all of Austria

[73] Assignee: DSM Melapur B.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/793,981
[22] PCT Filed: Sep. 8, 1995
[86] PCT No.: PCT/EP95/03529
  § 371 Date: Jun. 16, 1997
  § 102(e) Date: Jun. 16, 1997
[87] PCT Pub. No.: WO96/09344
  PCT Pub. Date: Mar. 28, 1996

[30] Foreign Application Priority Data

Sep. 21, 1994  [AT]  Austria ................................. 1785/94

[51] Int. Cl.⁷ .................................................. C08K 5/34
[52] U.S. Cl. .................................... 524/100; 524/494
[58] Field of Search ................... 524/100, 493, 524/494; 427/413

[56] References Cited

U.S. PATENT DOCUMENTS

| | | |
|---|---|---|
| 3,915,777 | 10/1975 | Kaplan ..................... 427/413 |
| 4,010,137 | 3/1977 | Brady ...................... 524/100 |
| 4,314,927 | 2/1982 | Theysohn et al. ............ 524/101 |
| 4,321,189 | 3/1982 | Ohshita et al. ............. 524/101 |
| 4,360,616 | 11/1982 | Papilagan ................. 427/100 |
| 4,528,304 | 7/1985 | Yoshimura et al. ........... 524/606 |
| 4,789,698 | 12/1988 | Bonten et al. .............. 524/494 |
| 4,963,610 | 10/1990 | Schmid et al. .............. 524/436 |
| 5,145,904 | 9/1992 | Muehlbach et al. ........... 524/494 |
| 5,225,464 | 7/1993 | Hill ....................... 524/494 |
| 5,332,778 | 7/1994 | Pipper et al. .............. 524/494 |
| 5,475,041 | 12/1995 | Weil et al. ................ 427/100 |
| 5,482,985 | 1/1996 | Baierweck et al. ........... 524/101 |
| 5,618,864 | 4/1997 | Court ...................... 524/100 |
| 5,618,865 | 4/1997 | Martens et al. ............. 427/100 |
| 5,674,972 | 10/1997 | Wabeeke et al. ............. 524/494 |
| 5,708,065 | 1/1998 | Martens et al. ............. 427/100 |
| 5,795,931 | 8/1998 | Katayama et al. ............ 524/494 |
| 5,859,099 | 1/1999 | Kasowski ................... 524/100 |

FOREIGN PATENT DOCUMENTS 53-049054  5/1978  Japan .
63-012661  1/1988  Japan .

OTHER PUBLICATIONS

*Database WPI*, abstract No. 73–07617u (Nov. 29, 1972).

CA 89 111 478u, 1978.

*Primary Examiner*—Veronica P. Hoke
*Attorney, Agent, or Firm*—Wenderoth, Lind & Ponack, L.L.P.

[57] ABSTRACT

Flame resistant glass fiber-reinforced polyamide resin composition with 10 to 40% by weight of melamine- or melemphosphoric acid reaction products or mixtures thereof as flame retardants and with 10 to 60% by weight of glass fibers.

9 Claims, No Drawings

FLAMEPROOF, GLASS FIBRE-REINFORCED POLYAMIDE RESIN COMPOUND WITH MELAMINE OR MELEMPHOSPHORIC ACID REACTION PRODUCTS AS FLAME RETARDANTS

Flame retardants for glass fiber-reinforced polyamide resin compositions are already known. Thus, for example, red phosphorus or halogen-containing flame retardants are employed on an industrial scale for flame resistant treatment of glass fiber-reinforced polyamide resin compositions.

However, these flame retardants have decisive disadvantages, since, for example, in the event of a fire the halogen-containing flame retardants release toxic and corrosive compounds, such as dioxins or hydrogen halides, especially during prolonged fires, and red phosphorus forms phosphine during processing and furthermore leads to end products which have an intense red to dark brown intrinsic color.

Suitable halogen-free flame retardants for polyamide resin compositions which are not glass fiber-reinforced, such as melamine cyanurate, in turn have the disadvantage that they do not achieve adequate flame retardancy in glass fiber-reinforced polyamide resin compositions. It was therefore necessary to discover flame retardants which also have the effect of adequate flame retardancy in glass fiber-reinforced polyamide resin compositions and release no corrosive and toxic compounds in the event of a fire.

The use of melamine phosphate and of condensed melamine phosphates, such as, for example, dimelamine pyrophosphate for rendering plastics other than polyamides flame retardant is already known from several literature sources. Thus, for example, U.S. Pat. No. 4,010,137 describes the use of these flame retardants in polyolefins and U.S. Pat. No. 3,915,777 describes the use for coatings. It is furthermore known from Chem. Abstr. Volume 89: 111478 that melamine phosphate, which can be converted into dimelamine pyrophosphate by splitting off water, can be employed as a flame retardant in a polyamide which comprises calcium silicate filler but is not glass fiber-reinforced. However, as comparison experiments have shown, the use of melamine phosphate and of condensed melamine phosphates, such as, for example, dimelamine pyrophosphate, in non-reinforced polyamides leads to completely unsatisfactory results in respect of flame resistance, since the desired burning class V-0 was not achieved.

Although melamine phosphate or melem phosphate and condensed melamine phosphates or melem phosphates, such as, for example, dimelamine pyrophosphate, do not give satisfactory results in flame resistant treatment of polyamide resin compositions which are not glass fiber-reinforced, it has now been found, unexpectedly, that polyamide resin compositions which comprise these compounds in combination with glass fibers have a very good flame resistance.

The present invention accordingly relates to a flame resistant, glass fiber-reinforced polyamide resin composition characterized in that it comprises 10 to 40% by weight of melamine- or melem-phosphoric acid reaction products or mixtures thereof as flame retardants and 10 to 60% by weight of glass fibers.

Polyamide resin compositions which have been given a flame resistant treatment according to the invention can be either homo- or copolyamide resin compositions.

Polyamides are obtained, for example, by polymerization of a lactam or an amino acid or by polycondensation of a diamine and a dicarboxylic acid. Examples of suitable polyamides are, for example, those which are obtained by polymerization of $\epsilon$-caprolactam, aminocaproic acid, 7-aminoheptanoic acid, 11-aminoundecanoic acid, 9-aminononanoic acid and $\alpha$-pyrrolidone or $\alpha$-piperidone, or polymers which are obtained by polycondensation of a diamine, such as, for example, hexamethylenediamine, nonamethylenediamine, undecamethylenediamine, dodecamethylenediamine and m-xylylenediamine, with a dicarboxylic acid, such as terephthalic acid, isophthalic acid, adipic acid, sebacic acid, a dibasic dodecanoic acid and glutaric acid, or by copolymerization thereof.

These are, for example, poly-$\epsilon$-caprolactam (nylon 6), polyhexamethyleneadipic acid amide (nylon 6/6), polyhexamethyleneazelaic acid amide (nylon 6/9), polyhexamethylenesebacic acid (nylon 6/10), polyhexamethylenedodecanedioic acid amide (nylon 6/12), polypyrrolidone (nylon 4), polycaprylolactam (nylon 8), poly($\omega$-aminoundecanoic acid) (nylon 11), poly($\omega$-dodecanelactam) (nylon 12) and copolyamides and terpolyamides thereof, such as, for example, nylon 6/66, nylon 6/12, nylon 6/6T, where T is terephthalic acid, nylon 66/BAC 6, where BAC is 1,3- or 1,4-bis-aminocyclohexane, nylon 6/66/12 and nylon 6/610/PACM 10, where PACM is 4,4'-diaminodicyclohexylmethane.

Preferred polyamides are nylon 6, nylon 6/6, nylon 6/10, nylon 6/12, nylon 11 and nylon 12. Nylon 6 and nylon 6/6 are particularly preferred.

The polyamide resin composition here can also comprise a mixture of two or more polyamides. The polyamide resin composition can furthermore comprise additional resins, such as, for example, polyesters, polyolefins, ABS, acrylonitrile/styrene/ethylene/vinyl acetate copolymers, EPDM rubber or other rubbers.

The polyamide resin composition to be given a flame resistant treatment has a content of 10–60% by weight, preferably 15–50% by weight, of glass fibers. The glass fibers can be employed in the form of short glass fibers, as long glass fibers, or also in the form of glass fiber mats.

The fiber mats here can comprise cut fibers having a length of 10 to 250 mm or continuous filaments laid down to give a nonwoven, it being possible for the fibers and filaments to be either in random orientation or aligned.

However, it is also possible to use other types of fiber, such as, for example, carbon fibers or aramid fibers, for reinforcing the polyamide resin composition. Glass fibers are preferably used, and short glass fibers are particularly preferably used.

The glass fiber-reinforced polyamide resin composition furthermore comprises 10–40% by weight, preferably 15–35% by weight, of melamin- or melem-phosphoric acid reaction products or mixtures thereof as flame retardants.

Suitable flame retardants for glass fiber-reinforced polyamide resin compositions are accordingly melamine- or melem-phosphoric acid reaction products or mixtures thereof.

Melamine- or melem-phosphoric acid reaction products are to be understood here as meaning compounds which are obtained by reaction of melamine or melem with phosphoric acid, the ratio of melamine or melem to phosphoric acid varying.

Starting from a melamine- or melem-phosphoric acid ratio of 1:1, different compounds can thus be obtained by using an excess of melamine or melem or of phosphoric acid. Examples of these compounds are melamine phosphate, melem phosphate, melem pyrophosphate, dimelamine pyrophosphate, dimelamine phosphate or melamine polyphosphates.

However, not only can the melamine- or melem-phosphoric acid reaction products be employed as an individual compound or as a mixture of several individual compounds for flame resistant treatment of the glass fiber-reinforced polyamide resin compositions, it is also possible to use a mixture of one or more individual compounds obtained by reaction of melamine or melem and phosphoric acid with unreacted melamine or melem or with unreacted phosphoric acid.

Melamine phosphate, melamine pyrophosphates and melamine polyphosphates, and mixtures thereof, are preferably used, and dimelamine pyrophosphate is particularly preferably used as flame retardant for glass fiber-reinforced polyamide resin compositions.

The abovementioned compounds are already known from the literature, and dimelamine pyrophosphate and melamine phosphate, for example, can thus be prepared, for example, analogously to EP 0 413 376.

If appropriate, the polyamide resin composition according to the invention can also comprise further flame retardants, preferably halogen-free flame retardants. Examples of suitable co-flame retardants are zink borate, zink phosphate, melamine sulfate or ammonium polyphosphate.

Customary additives, such as lubricants, dispersing agents and adhesion promoters, can furthermore be added to the polyamide resin composition according to the invention. The polyamide resins preferably additionally comprise dispersing agents, such as, for example, stearates, phosphonates, fatty acid amides or aerosils.

The flame resistant, glass fiber-reinforced polyamide resin composition is prepared by the processing techniques customary in the plastics industry, such as, for example, mixing the polyamide to be treated with the glass fibers and the flame retardant, and if appropriate with one or more of the abovementioned co-flame retardants and additives, in the desired weight ratios, melting the mixture and then granulating it. Devices customary in the plastics industry are suitable for carrying out the process, such as, for example, screw machines, extruders, kneaders, such as, for example, Buss or Brabender kneaders, or injection molding machines.

So that the finished polyamide resin composition comprises dimelamine pyrophosphate as a flame-retardant, it is possible to admix dimelamine pyrophosphate directly.

However, it is also possible to prepare dimelamine pyrophosphate in situ from melamine phosphate. For this, the polyamide to be treated, melamine phosphate and the glass fibers are metered in sequence and in the desired weight ratio into a twin-screw extruder with metering points for the polyamide, the glass fibers and the flame retardant.

Shortly before the end of the twin-screw extruder, vacuum degasing takes place, whereupon melamine phosphate undergoes condensation to dimelamine pyrophosphate, water being split off, and the extruded polyamide comprises dimelamine pyrophosphate.

About 4.2% by weight of water, based on the melamine phosphate, must be removed from the melamine phosphate in the vacuum degasing, for which a vacuum of at least 250 mbar is necessary. Liquid ring, reciprocating, membrane and rotary vane vacuum pumps are most suitable for achieving the required rough vacuum. The temperature during the vacuum degasing in this procedure is preferably 10 to 30° C. above the extrusion temperature of the polyamide to be processed.

The polyamide resin composition according to the invention exhibits burning class V-0 according to UL (Underwriter Laboratories) 94. One advantage is highly intumescent properties of the polyamide resin composition. The mechanical properties of the polyamides which have been given a flame resistant treatment with the flame retardants according to the invention furthermore are comparable with or sometimes even improved with respect to those of polyamides treated with flame retardants known from the prior art, for example with halogen-containing flame retardants or with red phosphorous.

The glass fiber-reinforced polyamide resin compositions treated with the flame retardants according to the invention are therefore suitable, for example, for the production of shaped articles which are employed in the electrical or electronics industry.

The following starting substances were used in the examples below:

| | |
|---|---|
| Polyamide 6/6 | Durethane A 31 (Bayer) |
| Polyamide 6 | Ultramid B4 (BASF) |
| Short glass fibers of 4.5 mm length | P 327 (Vetrotex) |
| Short glass fibers of 4.5 mm length | CS 300 (Vitrofil) |
| Melamine phosphate | Chemie Linz |
| Dimelamine pyrophosphate | Chemie Linz |
| Comperlan (fatty acid alkylolamide) | Henkel |

EXAMPLES 1–15

Granules of polyamide with glass fibers and dimelamine pyrophosphate were obtained by cold chopping on a twin-screw extruder from Leistritz. The twin-screw extruder was equipped with 3 metering points for the granules of plastic, for the flame retardant powder and for glass fibers. The extrusion temperatures were 270 to 300° C. and the throughputs were between 1 and 10 kg/hour.

The resulting granules had a bulk density of at least 600 g/hour and were then injection molded on an injection molding machine from Arburg to test specimens which were tested in respect of their burning properties in accordance with UL94 and their mechanical properties. All the test specimens achieved burning class V-0 according to UL-94 in this testing.

Various comparison experiments were furthermore carried out:

V-1: 25% by weight of dimelaminepyrophosphate was added as a flame retardant to polyamide 6/6 which comprised 25% by weight of calcium silicate (NYAD G20544, Nyco) instead of glass fibers.

V-2: 25% by weight of melaminecyanurate was added as a flame retardant to polyamide 6/6 with 25% by weight of glass fibers.

V-3: 9% by weight of red phosphorous was added as a flame retardant to polyamide 6/6 with 25% by weight of glass fibers.

V-4: 18% by weight of Dechlorane 602 (Occidental Chemical Corp.) and 6% by weight of antimony trioxide (Blue Star, BBU) were added as flame retardants to polyamide 6/6 with 25% by weight of glass fibers.

V-5: 10% by weight of dimelamine pyrophosphate was added as a flame retardant to polyamide 6/6 with 0% by weight of glass fibers.

The particular composition of the polyamide resin compositions and the results of the tests carried out are summarized in Tables 1 and 2.

The following abbreviations are used.

| | |
|---|---|
| Polyamide: | PA |
| Glass fibers Vitrofil: | CS300 |
| Glass fibers Vetrotex: | P327 |
| Flame retardant: | FR |
| Co-flame retardant: | CFR |
| Dimelamine pyrophosphate: | DMPP |
| Dispersing aid: | DA |

TABLE 1

Glass fiber-reinforced polyamides of burning class V-0 according to UL-94 (1.6 mm test specimen) with 25% of glass fibers (GF) and DMPP as the flame retardant

| Example | Polyamide | GF | FR | CFR | DA |
|---|---|---|---|---|---|
| 1 | PA 6/6 | CS300 | 30% | — | — |
| 2 | PA 6 | CS300 | 30% | — | |
| 3 | PA 6/6 | CS300 | 30% | — | 1% of Zn stearate |
| 4 | PA 6/6 | CS300 | 25% | 5% of Zn borate | 0.5% of Zn stearate |
| 5 | PA 6/6 | P327 | 20% | 5% of Zn borate | |
| 6 | PA 6 | P327 | 20% | 5% of Zn borate | |
| 7 | PA 6 | P327 | 20% | 5% of Zn borate | 1% of Aerosil |
| 8 | PA 6/6 | P327 | 20% | 5% of Zn borate | 0.5% of Comperlan |
| 9 | PA 6 | P327 | 20% | 5% of Zn phosphate | — |
| 10 | PA 6 | P327 | 20% | 5% of Zn phosphate | 0.5% of Comperlan |
| 11 | PA 6/6 | P327 | 20% | 5% of Zn borate | 1% of Zn stearate |
| 12 | PA 6/6 | P327 | 20% | 5% of Zn borate | 0.5% of Comperlan |
| 13 | PA 6/6 | P327 | 30% | — | 0.5% of Comperlan |
| 14 | PA 6/6 | P237 | 30% 15% | — | — |
| 15 | PA 6/6 | P327 | 15% 50% | — | 1% of Comperlan |

The polamides according to Example 1–13 each comprised 25% by weight of glass fibers, in Example 14 by weight of glass fibers was used and in Example 15 by weight of glass fibers was used. All the specimens achieved burning class V-0.

TABLE 2

| Example | Polyamide | GF | FR | UL 94 |
|---|---|---|---|---|
| V-1 | PA 6/6 | Ca silicate 25% | 25% | V-1 |
| V-2 | PA 6/6 | P237 15% | 25% of melamine cyanurate | V-1 |
| V-3 | PA 6/6 | P237 25% | 9% of red phosphorous | V-0 |
| V-4 | PA 6/6 | P237 25% | * | V-0 |
| V-5 | PA 6/6 | 0 | 10% of DMPP | V-2 |

* 18% of Dechlorane 602 + 6% of antimony trioxide

The following mechanical properties were checked: Impact strength (IS) in accordance with DIN 53453, notched impact strength (NIS), tensile strength (TS) and elongation (E) in accordance with DIN 53455, E modulus in accordance with DIN 53452/57 and flexural strength (FS) in accordance with DIN 53452/57.

| Example | IS [kJ/m$^3$] | NIS [kJ/m$^3$] | E [%] | E modulus [MPa] | PS [MPa] | TS [MPa] |
|---|---|---|---|---|---|---|
| 1 | 30 | 6 | 3 | 8000 | 160 | 130 |
| 2 | 35 | 7 | 2.5 | 6500 | 150 | 110 |
| 3 | 40 | 7 | 3 | 8000 | 170 | 130 |
| 4 | 35 | 8 | 3 | 9000 | 165 | 135 |
| 5 | 30 | 8 | 3 | 8500 | 170 | 125 |
| 6 | 30 | 7 | 2.5 | 8000 | 160 | 120 |
| 7 | 35 | 7 | 2.5 | 7500 | 155 | 130 |
| 8 | 40 | 10 | 3 | 9000 | 165 | 130 |
| 9 | 45 | 9 | 2.5 | 7000 | 150 | 120 |
| 10 | 35 | 8 | 2.5 | 7000 | 160 | 120 |
| 11 | 40 | 6 | 3 | 8500 | 180 | 140 |
| 12 | 40 | 7 | 3 | 9000 | 190 | 130 |
| 13 | 35 | 9 | 3 | 9000 | 185 | 135 |
| 14 | 30 | 5 | 4 | 6500 | 150 | 100 |
| 15 | 55 | 10 | 2 | 16000 | 250 | 230 |
| V1 | 45 | 4 | 3 | 8000 | 150 | 80 |
| V2 | 4.5 | — | 3 | 5000 | 110 | 70 |
| V3 | 45 | 11 | 3 | 8500 | 120 | 70 |
| V4 | 32 | 5 | 2 | 8500 | 150 | 130 |

EXAMPLE 16

On a twin-screw extruder, polyamide 6/6 from Bayer with the trade name Durethane A31 in granule form was metered in to Section 1. The flame retardant was added in Section 4. Melamine phosphate from Chemie Linz GmbH was used as the flame retardant. The glass fibers were added in Section 6. The vacuum degasing took place in Section 8. The temperature profile was chosen so that the temperature was 270° C. for metering of the polyamide, 280° C. for the vacuum suction and 260° C. at the die. The throughput was 5 kg/hour. The extruded strand was passed through a water bath for cooling and comminuted in a cold chopper to cylindrical granules which had a bulk density greater than 600 g/l. These granules were either pressed to sheets or injection molded to sheets in an injection molding machine. The test specimens thus produced exhibit burning class V-0 according to UL94 and adequate mechanical properties.

EXAMPLE 17

Polyamide 6/6 was processed on a twin-screw extruder with 25% by weight of glass fibers P237 and 20% by weight of a melamine-phosphoric acid reaction product with a melamine/phosphoric acid ratio of 2:1 analogously to Example 1–15 to give granules, which were injection molded to sheets 1.6 mm thick.

The UL94 burning test resulted in a V-0 classification of the test specimens.

The reaction product was prepared by reaction of melamine and phosphoric acid in the appropriate weight ratio in the presence of water and subsequent evaporation of the reaction mixture.

After the evaporation, the reaction product thus obtained was kept at 250° C. for 3 hours and employed for flame resistant treatment in the manner described.

EXAMPLE 18

Analogously to Example 17, polyamide 6/6 was processed to granules and then to sheets with 25% by weight of glass fibers P237 and 30% by weight of a melamine-phosphoric acid reaction product with a melamine/phosphoric acid ratio of 1:2.

Burning class V-0 according to UL94 was again achieved.

We claim:

1. Flame resistant, glass fiber-reinforced polyamide resin composition having a burning class of V-0 according to UL94, comprising 10 to 40% by weight of melamine- or melem-phosphoric acid salts or mixtures thereof with the exception of melamine pyrophosphates as flame retardants and 10 to 60% by weight of glass fibers.

2. Flame resistant, glass fiber-reinforced polyamide resin composition having a burning class of V-0 according to UL94, consisting essentially of 10 to 40% by weight of melamine- or melem-phosphoric acid salts or mixtures thereof with the exception of melamine pyrophosphates as flame retardants and 10 to 60% by weight of glass fibers.

3. Flame resistant glass fiber-reinforced polyamide resin composition according to claim 1, comprising melamine phosphate, or melamine polyphosphates or mixtures thereof as flame retardants.

4. Flame resistant glass fiber-reinforced polyamide resin composition according to claim 1, comprising 15–35% by weight of flame retardants.

5. Flame resistant glass fiber-reinforced polyamide resin composition according to claim 1, comprising additional flame retardants.

6. Flame resistant glass fiber-reinforced polyamide resin composition according to claim 5, wherein zinc borate, zinc phosphate, melamine sulfate or ammonium polyphosphate is used as an additional flame retardant.

7. Flame resistant glass fiber-reinforced polyamide resin composition according to claim 1, comprising additional additives comprising dispersing agents, lubricants or adhesion promoters.

8. Flame resistant glass fiber-reinforced polyamide resin composition according to claim 5, comprising stearates, phosphonates, fatty acid amides or pyrogenic silica as dispersing agents.

9. Process for the preparation of a flame resistant glass fiber-reinforced polyamide resin composition according to claim 1, comprising mixing a polyamide with glass fibers and with the flame retardant, and optionally, with additional flame retardants and additives, in the desired weight ratio, and melting and processing the mixture to form granules or to form shaped articles.

* * * * *